US012669160B2

(12) United States Patent
Yamada et al.

(10) Patent No.: US 12,669,160 B2
(45) Date of Patent: Jun. 30, 2026

(54) SPRING MEMBER

(71) Applicant: NHK SPRING Co., Ltd., Yokohama (JP)

(72) Inventors: Yoshio Yamada, Yokohama (JP); Hironobu Imaizumi, Yokohama (JP); Norihiro Tajima, Yokohama (JP); Shuji Takahashi, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 484 days.

(21) Appl. No.: 18/278,512

(22) PCT Filed: Feb. 25, 2022

(86) PCT No.: PCT/JP2022/007909
§ 371 (c)(1),
(2) Date: Aug. 23, 2023

(87) PCT Pub. No.: WO2022/181770
PCT Pub. Date: Sep. 1, 2022

(65) Prior Publication Data

US 2024/0133442 A1    Apr. 25, 2024
US 2024/0229886 A9    Jul. 11, 2024

(30) Foreign Application Priority Data

Feb. 26, 2021    (JP) ................................. 2021-029867

(51) Int. Cl.
*F16F 1/18*        (2006.01)

(52) U.S. Cl.
CPC ..................................... *F16F 1/18* (2013.01)

(58) Field of Classification Search
CPC ............................ F16F 1/18–187; F16F 1/027
See application file for complete search history.

(56) References Cited

U.S. PATENT DOCUMENTS 5,785,303 A * 7/1998 Kutschi .................. A47C 23/02
                                                          267/86
6,427,990 B1    8/2002 Hartmann

FOREIGN PATENT DOCUMENTS

CN        102472308 A      5/2012
CN        106763380 A      5/2017
                (Continued)

OTHER PUBLICATIONS

SIPO The First Office Action for corresponding CN Application No. 202280016571.7; Issued Jul. 10, 2025.
                (Continued)

*Primary Examiner* — David R Morris
(74) *Attorney, Agent, or Firm* — CANTOR COLBURN LLP

(57)                ABSTRACT

A spring member is provided between two pressed bodies facing each other in a first direction and includes base plates stacked in the first direction. Each base plate is provided with spring protrusions protruding toward either one pressed body of the two pressed bodies and pressing the two pressed bodies in directions such that the pressed bodies move away from each other in the first direction. Between two base plates adjacent to each other in the first direction, a base plate positioned closer to the one pressed body is provided with an insertion hole into which a spring protrusion of the other base plate is inserted in a state of penetrating therethrough in the first direction. Among portions in an along-plane direction along a plane orthogonal to the first direction provided with the spring protrusions, the spring constant of at least one portion is different from that of another portion.

6 Claims, 9 Drawing Sheets

(56) References Cited

FOREIGN PATENT DOCUMENTS

| CN | 108223657 | A | | 6/2018 |
|----|-----------|---|---|--------|
| JP | 53129030 | U | | 10/1978 |
| JP | 54010149 | U | | 1/1979 |
| JP | 2012129108 | A | | 7/2012 |
| JP | 5703737 | B2 | | 3/2015 |
| JP | 2022131108 | A | * | 9/2022 |

OTHER PUBLICATIONS

International Search Report for International Application No. PCT/
JP2022/007909; Mailing Date, Apr. 19, 2022.

* cited by examiner

SPRING MEMBER

CROSS REFERENCE TO RELATED APPLICATIONS

This is the U.S. national stage of application No. PCT/JP2022/007909, filed on Feb. 25, 2022. Priority under 35 U.S.C. § 119(a) and 35 U.S.C. § 365(b) is claimed from Japanese Application No. 2021-029867, filed Feb. 26, 2021, the disclosure of which is also incorporated herein by reference.

TECHNICAL FIELD

The present invention relates to a spring member.

BACKGROUND ART

Conventionally, as shown in, for example, Patent Document 1 below, a spring member is known which is provided between two pressed bodies facing each other in a first direction and includes a base plate with front and back surfaces directed in the first direction, the base plate is provided with a plurality of spring protrusions protruding in the first direction, and the spring protrusions press the two pressed bodies in directions such that the pressed bodies move away from each other in the first direction.

DOCUMENT OF RELATED ART

Patent Document

[Patent Document 1] Japanese Patent No. 5703737

SUMMARY OF INVENTION

Problems to Solved by Invention

However, in the conventional spring member, the spring constant thereof cannot be made to be different between a plurality of positions in an along-plane direction along a plane orthogonal to the first direction, and for example, restrictions on the structure and types of products to which the spring member can be applied may easily occur.

The present invention is made in view of the above circumstances, and an object thereof is to provide a spring member that can have a spring constant made to be different between a plurality of positions in an along-plane direction along a plane orthogonal to a first direction.

Means for Solving Problems

In order to solve the above problems and to obtain the above object, a spring member of a first aspect of the present invention is a spring member for being provided between two pressed bodies facing each other in a first direction. The spring member includes a plurality of base plates stacked in the first direction. Each base plate is provided with a plurality of spring protrusions configured to protrude toward either one pressed body of the two pressed bodies and to press the two pressed bodies in directions such that the pressed bodies move away from each other in the first direction. Between two base plates of the plurality of base plates adjacent to each other in the first direction, a base plate positioned closer to the one pressed body is provided with an insertion hole into which a spring protrusion of the other base plate is inserted in a state of penetrating the insertion hole in the first direction. Among a plurality of portions in an along-plane direction along a plane orthogonal to the first direction provided with the plurality of spring protrusions, a spring constant of at least one portion is different from a spring constant of another portion.

According to the first aspect, among the plurality of portions in the along-plane direction along a plane orthogonal to the first direction provided with the spring protrusions, the spring constant of at least one portion is different from the spring constant of another portion, so it is possible to obtain the spring member with different spring constants between a plurality of positions in the along-plane direction.

Since the plurality of base plates stacked in the first direction are provided, it is possible to easily expand or the like the range of selection of physical property values such as Young's modulus of the plurality of spring protrusions, and it can be less likely to cause restrictions on the structure and types of products to which the spring member is applied.

A spring member of a second aspect of the present invention is a spring member for being provided between two pressed bodies facing each other in a first direction. The spring member includes one base plate with front and back surfaces directed in the first direction. The base plate is provided with a plurality of spring protrusions protruding in the first direction and configured to press the two pressed bodies in directions such that the pressed bodies move away from each other in the first direction. Among the plurality of spring protrusions, the thickness of at least a spring protrusion is different from the thickness of another spring protrusion.

According to the second aspect, the thickness of at least a spring protrusion of the plurality of spring protrusions is different from the thickness of another spring protrusion thereof, so it is possible to easily obtain the spring member with different spring constants between a plurality of positions in the along-plane direction.

In the first aspect, among the plurality of spring protrusions provided in at least one base plate of the plurality of base plates, the volume of a spring protrusion provided in the one portion may be different from the volume of a spring protrusion provided in the other portion.

In this case, among the plurality of spring protrusions provided in the one base plate, the volume of the spring protrusion provided in the one portion is different from that of the spring protrusion provided in the other portion, so it is possible to easily obtain the spring member with different spring constants between a plurality of positions in the along-plane direction.

In the first aspect, the number of spring protrusions positioned in the one portion may be different from the number of spring protrusions positioned in the other portion, and spring protrusions positioned in an equal portion may be stacked in the first direction.

In this case, among the plurality of portions in the along-plane direction provided with the spring protrusions, the number of spring protrusions positioned in the one portion is different from the number of spring protrusions positioned in the other portion, so it is possible to easily obtain the spring member with different spring constants between a plurality of positions in the along-plane direction.

In the first aspect, among the plurality of base plates, the Young's modulus of a material forming at least one base plate may be different from the Young's modulus of a material forming another base plate.

In this case, the Young's modulus of a material forming at least one base plate of the plurality of base plates is different from the Young's modulus of a material forming another base plate thereof, so it is possible to easily obtain the spring member with different spring constants between a plurality of positions in the along-plane direction.

In the first aspect, at least part of portions of the base plates, the portions contacting the pressed bodies, may be electrically insulated from the pressed bodies, and the two pressed bodies may be pressed in directions such that the pressed bodies move away from each other in the first direction in an electrical insulation state therebetween.

In this case, the two pressed bodies are pressed in directions such that the pressed bodies move away from each other in the first direction in an electrical insulation state therebetween, so it is possible to obtain the spring member suitable for products requiring electrical insulation between the two pressed bodies.

Effects of Invention

According to the present invention, the spring constant can be made to be different between a plurality of positions in an along-plane direction along a plane orthogonal to a first direction.

EMBODIMENTS OF INVENTION

A first embodiment of a spring member according to the present invention is described below with reference to the drawings.

Figures 1A, 1B:
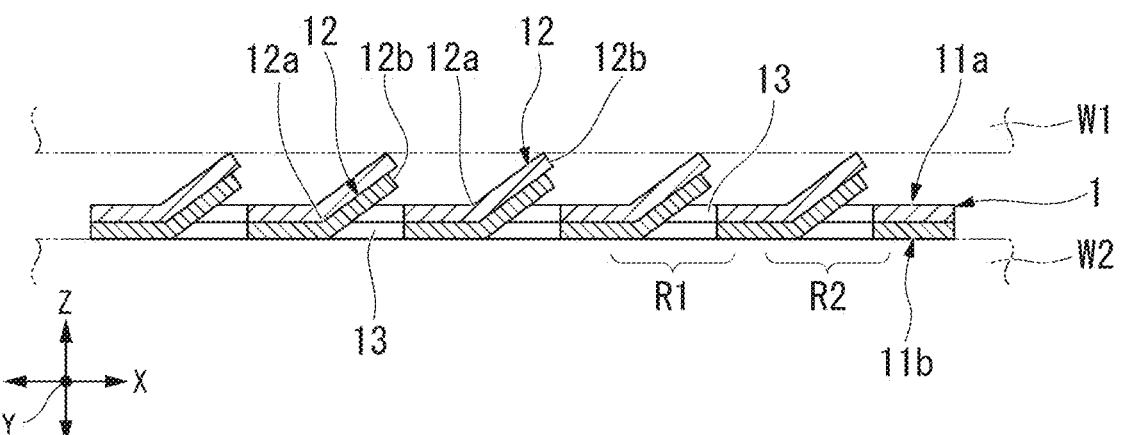
FIG. 1A is a plan view of a spring member of a first embodiment viewed in a first direction.
FIG. 1B is a cross-sectional view taken along line 1B-1B and viewed in an arrow direction in FIG. 1A.

As shown in FIG. 1A and FIG. 1B, a spring member 1 of the present embodiment is configured to be provided between two pressed bodies W1 and W2 facing each other in a first direction Z. The spring member 1 includes a plurality of base plates 11a and 11b stacked in the first direction Z. Each of the base plates 11a and 11b is disposed whose front and back surfaces are directed in the first direction Z. The base plates 11a and 11b adjacent to each other in the first direction Z are fixed to each other by, for example, welding, crimping, frames, pins, or fastening members. The base plates 11a and 11b are made of, for example, carbon steel, stainless steel or the like.

The base plates 11a and 11b adjacent to each other in the first direction Z may be positioned by frames, pins or the like in an along-plane direction along a plane orthogonal to the first direction Z (i.e., a direction parallel to the plane, or a direction orthogonal to the first direction Z).

Each of the base plates 11a and 11b is provided with a plurality of spring protrusions 12 configured to protrude toward either one pressed body of the two pressed bodies W1 and W2 and to press the two pressed bodies W1 and W2 in directions such that the pressed bodies W1 and W2 move away from each other in the first direction Z.

One end part (hereinafter referred to as a base end part 12a) of the spring protrusion 12 is a fixed end connected to each of the base plates 11a and 11b (parts of the base plates 11a and 11b parallel to the along-plane direction), another end part (hereinafter referred to as a tip part 12b) thereof is a free end, and thus the spring protrusion 12 is supported to be cantilevered.

The spring protrusion 12 has a rectangular shape with four sides when viewed in the first direction Z. When viewed in the first direction Z, the spring protrusion 12 has a rectangular shape in which opposite sides of the four sides are equal to each other in length. The spring protrusion 12 may have a trapezoidal shape or the like when viewed in the first direction Z.

One of the four sides is the base end part 12a connected to each of the base plates 11a and 11b, another thereof that is the opposite side to the base end part 12a is the tip part 12b, and the spring protrusion 12 extends toward the one pressed body as going from the base end part 12a toward the tip part 12b. In other words, the spring protrusion 12 extends diagonally in one direction of the along-plane directions and a direction parallel to the first direction Z and toward the one pressed body. As shown in FIG. 1B, the front and back surfaces of the spring protrusion 12 extend linearly from the base end part 12a toward the tip part 12b. The front and back surfaces of the spring protrusion 12 may extend in a curved shape from the base end part 12a toward the tip part 12b.

Extending directions of the plurality of spring protrusions 12 provided in each base plate of the base plates 11a and 11b from the base end part 12a toward the tip part 12b in the along-plane direction along a plane orthogonal to the first direction Z are the same as each other. The extending directions are the same as each other between the base plates 11a and 11b.

Hereinafter, among the along-plane directions, a direction orthogonal to the base end part 12a and the tip part 12b of the spring protrusion 12 is referred to as a second direction X, and a direction along the base end part 12a and the tip part 12b of the spring protrusion 12 is referred to as a third direction Y.

A plurality of spring protrusions 12 are provided at equal pitch intervals in the second direction X, and a plurality of spring protrusions 12 are provided at equal pitch intervals in the third direction Y. In the present embodiment, the interval in the second direction X is different from the interval in the third direction Y, but these intervals may be equal.

The pitch intervals in each of the second direction X and the third direction Y may be uneven, and the pitch intervals may be different from each other between the base plates 11*a* and 11*b*.

Protruding directions of the plurality of spring protrusions 12 provided in each base plate of the base plates 11*a* and 11*b* in the first direction Z are the same as each other. The protruding directions are the same as each other between the base plates 11*a* and 11*b*. As shown in FIG. 1B, the plurality of spring protrusions 12 protrude toward the first pressed body W1 of the two pressed bodies W1 and W2.

Among the plurality of spring protrusions 12 provided in each base plate of the base plates 11*a* and 11*b*, the protruding direction of a spring protrusion 12 and that of another spring protrusion 12 may be made to be opposite to each other in the first direction Z.

The positions of the tip parts 12*b* of the plurality of spring protrusions 12 provided in each base plate of the base plates 11*a* and 11*b* in the first direction Z are the same as each other. The positions of the tip parts 12*b* in the first direction Z may be different from each other.

The inclination angles of the plurality of spring protrusions 12 provided in each base plate of the base plates 11*a* and 11*b* with respect to the first direction Z are equal to each other. The inclination angles are also equal to each other between the base plates 11*a* and 11*b*. Among the plurality of spring protrusions 12 provided in each of the base plates 11*a* and 11*b*, the inclination angle of at least a spring protrusion 12 may be made to be different from that of another spring protrusion 12.

Between the two base plates 11*a* and 11*b* adjacent to each other in the first direction Z, the first base plate 11*a* positioned closer to the first pressed body W1 is provided with a plurality of first insertion holes 13 into which the spring protrusions 12 of the second base plate 11*b* are inserted in a state of penetrating therethrough in the first direction Z.

The first insertion holes 13 are provided in all positions of each of the base plates 11*a* and 11*b* facing the plurality of spring protrusions 12 in the first direction Z. The size of the first insertion hole 13 in each of the base plates 11*a* and 11*b* is equal to or greater than that of the spring protrusion 12 facing the first insertion hole 13 in the first direction Z. In the present embodiment, the spring protrusions 12 and the first insertion holes 13 are formed by press molding.

In all portions in the along-plane direction provided with the spring protrusions 12, the spring protrusions 12 provided in the two base plates 11*a* and 11*b* are stacked in the first direction Z. The centers in the third direction Y of the spring protrusions 12 stacked in the first direction Z coincide with each other.

Among a plurality of portions of the spring member 1 of the present embodiment in the along-plane direction provided with the spring protrusions 12, the spring constant of at least a portion R1 is different from the spring constant of another portion R2. Among the plurality of spring protrusions 12 provided in the base plates 11*a* and 11*b*, the volume of at least a spring protrusion 12 is different from that of another spring protrusion 12. In other words, among the plurality of spring protrusions 12 provided in at least one base plate (i.e., the base plate 11*b* in the present embodiment) of the plurality of base plates 11*a* and 11*b*, the volume of a spring protrusion 12 provided in the portion R1 is different from that of another spring protrusion 12 provided in the portion R2. Among the plurality of spring protrusions 12 provided in the base plates 11*a* and 11*b*, at least one of the length, the width, and the thickness of at least a spring protrusion 12 is different from that of another spring protrusion 12. In other words, among the plurality of spring protrusions 12 provided in at least one base plate (i.e., the base plate 11*b* in the present embodiment) of the plurality of base plates 11*a* and 11*b*, at least one of the length, the width, and the thickness of a spring protrusion 12 provided in the portion R1 is different from that of another spring protrusion 12 provided in the portion R2.

By making external dimensions such as length, width, and thickness of the plurality of spring protrusions 12 provided in the base plates 11*a* and 11*b* to be the same as each other and providing a through-hole penetrating a spring protrusion 12 in the thickness direction thereof, among the plurality of spring protrusions 12 provided in the base plates 11*a* and 11*b*, the volume of at least a spring protrusion 12 may be different from that of another spring protrusion 12.

As shown in FIG. 1A and FIG. 1B, the plurality of spring protrusions 12 provided in the first base plate 11*a* of the two base plates 11*a* and 11*b* positioned closer to the first pressed body W1 are formed to have an equal size (volume), and among the plurality of spring protrusions 12 provided in the second base plate 11*b*, the widths (i.e., the sizes in the third direction Y) of spring protrusions 12 positioned in a central area (including the portion R1) of the second base plate 11*b* in the along-plane direction are less than the widths of spring protrusions 12 positioned in an outer peripheral edge portion (including the portion R2) of the second base plate 11*b*. In other words, among the plurality of spring protrusions 12 provided in the second base plate 11*b*, the width or the volume of a spring protrusion 12 provided in the portion R1 is less than the width or the volume of another spring protrusion 12 provided in the portion R2.

The widths of the spring protrusions 12 positioned in the outer peripheral edge portion of the second base plate 11*b* are equal to the widths of the spring protrusions 12 provided in the first base plate 11*a*. The lengths of the plurality of spring protrusions 12 provided in the two base plates 11*a* and 11*b* are equal to each other, and the thicknesses of the plurality of spring protrusions 12 provided in the two base plates 11*a* and 11*b* are equal to each other. The two base plates 11*a* and 11*b* are made of an equal material. The two base plates 11*a* and 11*b* have an equal thickness.

Therefore, among a plurality of portions in the along-plane direction provided with the spring protrusions 12, the spring constant of each portion provided in the outer peripheral edge portion of the spring member 1 is higher than the spring constant of each portion provided in the central area of the spring member 1 in the along-plane direction.

As described above, according to the spring member 1 of the present embodiment, among a plurality of portions in the along-plane direction provided with the spring protrusions 12, the spring constant of at least a portion is different from the spring constant of another portion, so it is possible to obtain the spring member 1 with different spring constants between a plurality of positions in the along-plane direction.

Since the plurality of base plates 11*a* and 11*b* stacked in the first direction Z are provided, it is possible to easily expand or the like the range of selection of physical property values such as Young's modulus of the plurality of spring protrusions 12, and it can be less likely to cause restrictions on the structure and types of products to which the spring member 1 can be applied.

Among the plurality of spring protrusions 12 provided in the base plates 11*a* and 11*b*, the volume of at least a spring protrusion 12 is different from that of another spring protrusion 12, so it is possible to easily obtain the spring member 1 with different spring constants between a plurality of positions in the along-plane direction.

Figures 2A, 2B:
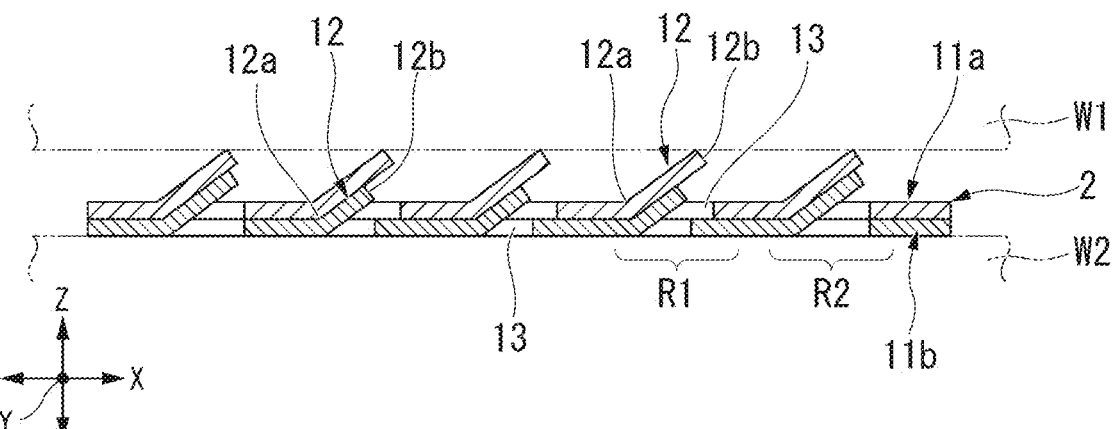
FIG. 2A is a plan view of a spring member of a second embodiment viewed in a first direction.
FIG. 2B is a cross-sectional view taken along line 2B-2B and viewed in an arrow direction in FIG. 2A.

Next, a spring member 2 according to a second embodiment of the present invention is described with reference to FIG. 2A and FIG. 2B.

In the second embodiment, the same components as those in the first embodiment have the same reference signs, the descriptions thereof are omitted, and only the points of difference are described.

In the spring member 2 of the present embodiment, a plurality of spring protrusions 12 provided in a first base plate 11a are formed to have an equal size (volume), and among a plurality of spring protrusions 12 provided in a second base plate 11b, the length (i.e., the size in a second direction X) of a spring protrusion 12 is different from that of another spring protrusion 12. As shown in FIG. 2A and FIG. 2B, the lengths of spring protrusions 12 positioned in a central area (including a portion R1) of the second base plate 11b in an along-plane direction are less than those of spring protrusions 12 positioned in an outer peripheral edge portion (including a portion R2) of the second base plate 11b.

The lengths of the spring protrusions 12 positioned in the outer peripheral edge portion of the second base plate 11b are equal to those of the spring protrusions 12 provided in the first base plate 11a. The widths of the plurality of spring protrusions 12 provided in the two base plates 11a and 11b are equal to each other, and the thicknesses of the plurality of spring protrusions 12 provided in the two base plates 11a and 11b are equal to each other.

Therefore, in the spring member 2, among a plurality of portions in the along-plane direction provided with the spring protrusions 12, the spring constant of each portion provided in the outer peripheral edge portion of the spring member 2 is lower than that of each portion provided in the central area of the spring member 2 in the along-plane direction.

As described above, according to the spring member 2 of the present embodiment, among the plurality of spring protrusions 12 provided in the base plates 11a and 11b, the length of at least a spring protrusion 12 is different from that of another spring protrusion 12, so it is possible to easily obtain or the like the spring member 2 with different spring constants between a plurality of positions in the along-plane direction.

Next, a spring member 3 according to a third embodiment of the present invention is described with reference to FIG. 3A and FIG. 3B.

In the third embodiment, the same components as those in the first embodiment have the same reference signs, the descriptions thereof are omitted, and only the points of difference are described.

In the spring member 3 of the present embodiment, a plurality of spring protrusions 12 provided in a first base plate 11a are formed to have an equal size, and among a plurality of spring protrusions 12 provided in a second base plate 11b, the thickness of a spring protrusion 12 is different from that of another spring protrusion 12. As shown in FIG. 3A and FIG. 3B, the thicknesses of spring protrusions 12 positioned in a central area (including a portion R1) of the second base plate 11b in an along-plane direction are less than those of spring protrusions 12 provided in an outer peripheral edge portion (including a portion R2) of the second base plate 11b.

The thicknesses of the spring protrusions 12 positioned in the outer peripheral edge portion of the second base plate 11b are equal to the thicknesses of the spring protrusions 12 provided in the first base plate 11a. The lengths of the plurality of spring protrusions 12 provided in the two base plates 11a and 11b are equal to each other, and the widths of the plurality of spring protrusions 12 provided in the two base plates 11a and 11b are equal to each other.

Therefore, in the spring member 3, among a plurality of portions in the along-plane direction provided with the spring protrusions 12, the spring constant of each portion provided in the outer peripheral edge portion of the spring member 3 is higher than that of each portion provided in the central area of the spring member 3 in the along-plane direction.

Figures 3A, 3B:
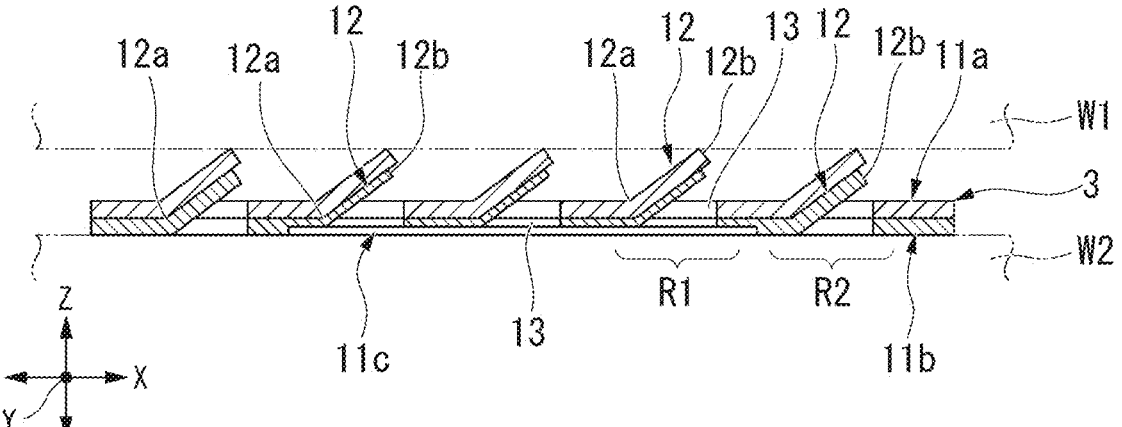
FIG. 3A is a plan view of a spring member of a third embodiment viewed in a first direction.
FIG. 3B is a cross-sectional view taken along line 3B-3B and viewed in an arrow direction in FIG. 3A.

As shown in FIG. 3B, the thickness of the first base plate 11a is fixed on the entire area thereof. The thickness of the central area of the second base plate 11b in the along-plane direction is less than that of the outer peripheral edge portion of the second base plate 11b. The thickness of the outer peripheral edge portion of the second base plate 11b is equal to that of the first base plate 11a.

Between the front and back surfaces of the second base plate 11b, the central area in the along-plane direction of a surface facing a second pressed body W2 of two pressed bodies W1 and W1 is provided with a recess 11c, whereby the thickness of the central area of the second base plate 11b in the along-plane direction is less than that of the outer peripheral edge portion of the second base plate 11b. The recess 11c is formed by, for example, etching, cutting, pressing or the like. The plurality of spring protrusions 12 of the present embodiment are formed by press molding after the recess 11c is formed.

If, for example, work hardening or the like occurs when the recess 11c is formed and the central area of the second base plate 11b in the along-plane direction becomes hard, among a plurality of portions in the along-plane direction provided with the spring protrusions 12, the spring constant of each portion provided in the outer peripheral edge portion of the spring member 3 may be lower than that of each portion provided in the central area of the spring member 3 in the along-plane direction.

The recess 11c may be provided in a surface of the front and back surfaces of the second base plate 11b facing the first pressed body W1 of the two pressed bodies W1 and W2.

As described above, according to the spring member 3 of the present embodiment, among the plurality of spring protrusions 12 provided in the base plates 11a and 11b, the thickness of at least a spring protrusion 12 is different from that of another spring protrusion 12, so it is possible to easily obtain or the like the spring member 3 with different spring constants between a plurality of positions in the along-plane direction.

Next, a spring member 4 according to a fourth embodiment of the present invention is described with reference to FIG. 4A and FIG. 4B.

In the fourth embodiment, the same components as those in the first embodiment have the same reference signs, the descriptions thereof are omitted, and only the points of difference are described.

In the spring member 4 of the present embodiment, a plurality of spring protrusions 12 provided in each of base plates 11a and 11b are formed to have an equal size. The plurality of spring protrusions 12 are provided in only an outer peripheral edge portion (including a portion R2) of the second base plate 11b, no spring protrusion 12 is provided in a central area (including a portion R1) of the second base plate 11b in an along-plane direction, and the central area in the along-plane direction is formed to be flat.

Thereby, among a plurality of portions in the along-plane direction provided with the spring protrusions 12, the number of spring protrusions 12 positioned in each portion provided in the outer peripheral edge portion of the spring member 4 is greater than the number of spring protrusions 12 positioned in each portion provided in the central area of the spring member 4 in the along-plane direction. That is, among a plurality of portions in the along-plane direction provided with the spring protrusions 12, the number of spring protrusions 12 positioned in at least a portion is different from the number of spring protrusions 12 positioned in another portion.

Figures 4A, 4B:
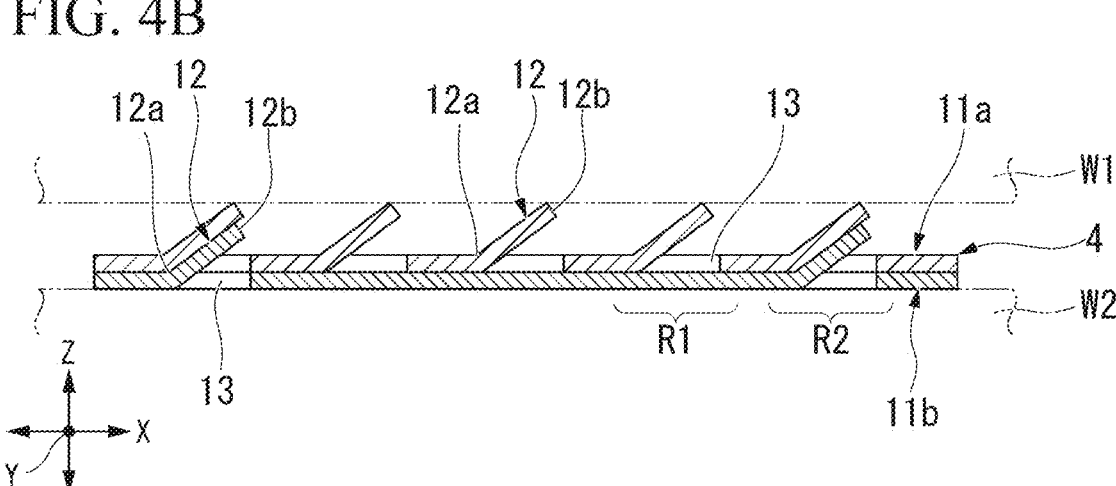
FIG. 4A is a plan view of a spring member of a fourth embodiment viewed in a first direction.
FIG. 4B is a cross-sectional view taken along line 4B-4B and viewed in an arrow direction in FIG. 4A.

As shown in FIG. 4B, the number of spring protrusions 12 positioned in each portion provided in the outer peripheral edge portion of the spring member 4 is two, these spring protrusions 12 are stacked in a first direction Z, and the number of spring protrusions 12 positioned in each portion provided in the central area of the spring member 4 in the along-plane direction is one. That is, in the portion R2, two spring protrusions 12 of the base plates 11*a* and 11*b* are stacked together, and in the portion R1, only the spring protrusion 12 of the base plate 11*a* is provided.

Therefore, among a plurality of portions in the along-plane direction provided with the spring protrusions 12, the spring constant of each portion provided in the outer peripheral edge portion of the spring member 4 is higher than that of each portion provided in the central area of the spring member 4 in the along-plane direction.

As described above, according to the spring member 4 of the present embodiment, among a plurality of portions in the along-plane direction provided with the spring protrusions 12, the number of spring protrusions 12 positioned in at least a portion is different from the number of spring protrusions 12 positioned in another portion, so it is possible to easily obtain or the like the spring member 4 with different spring constants between a plurality of positions in the along-plane direction.

Next, a spring member 5 according to a fifth embodiment of the present invention is described with reference to FIG. 5A and FIG. 5B.

In the fifth embodiment, the same components as those in the first embodiment have the same reference signs, the descriptions thereof are omitted, and only the points of difference are described.

In the spring member 5 of the present embodiment, a plurality of spring protrusions 12 provided in each base plate of base plates 11*a* and 11*b* are formed to have an equal size.

The plurality of spring protrusions 12 are provided in only an outer peripheral edge portion of the first base plate 11*a*, and a central area of the first base plate 11*a* in an along-plane direction is provided with a second insertion hole 14. The second insertion hole 14 is larger than the spring protrusions 12 provided in the second base plate 11*b*. The plurality of spring protrusions 12 are provided in only a central area of the second base plate 11*b* in the along-plane direction, no spring protrusion 12 is provided in an outer peripheral edge portion of the second base plate 11*b*, and the outer peripheral edge portion is formed to be flat.

The plurality of spring protrusions 12 provided in the second base plate 11*b* are inserted into the second insertion hole 14 of the first base plate 11*a* in a state of penetrating therethrough in a first direction Z. All of the plurality of spring protrusions 12 provided in each of the base plates 11*a* and 11*b* are configured to contact a first pressed body W1. The lengths of the spring protrusions 12 provided in the second base plate 11*b* are greater than those of the spring protrusions 12 provided in the first base plate 11*a*. The length of the former may be the same as that of the latter.

The number of spring protrusions 12 positioned in each of portions in the along-plane direction provided with spring protrusions 12 is one. The Young's modulus of a material forming the first base plate 11*a* is different from the Young's modulus of a material forming the second base plate 11*b*. That is, the Young's modulus of a material forming at least one base plate of the plurality of base plates 11*a* and 11*b* is different from the Young's modulus of a material forming another base plate thereof.

Therefore, among a plurality of portions in the along-plane direction provided with the spring protrusions 12, the spring constant of each portion provided in the outer peripheral edge portion of the spring member 5 is different from that of each portion provided in the central area of the spring member 5 in the along-plane direction.

In order to make the Young's modules of materials of the first base plate 11*a* and the second base plate 11*b* be different, in addition to making the materials themselves be different, for example, the presence or absence of heat treatment or the like may be made to be different with respect to equal materials, or the condition of heat treatment or the like may be made to be different with respect thereto.

As described above, according to the spring member 5 of the present embodiment, the Young's modulus of a material forming at least one base plate of the plurality of base plates 11*a* and 11*b* is different from the Young's modulus of a material forming another base plate thereof, so it is possible to easily obtain or the like the spring member 5 with different spring constants between a plurality of positions in the along-plane direction.

Next, a spring member 6 according to a sixth embodiment of the present invention is described with reference to FIG. 6.

Figure 5A:
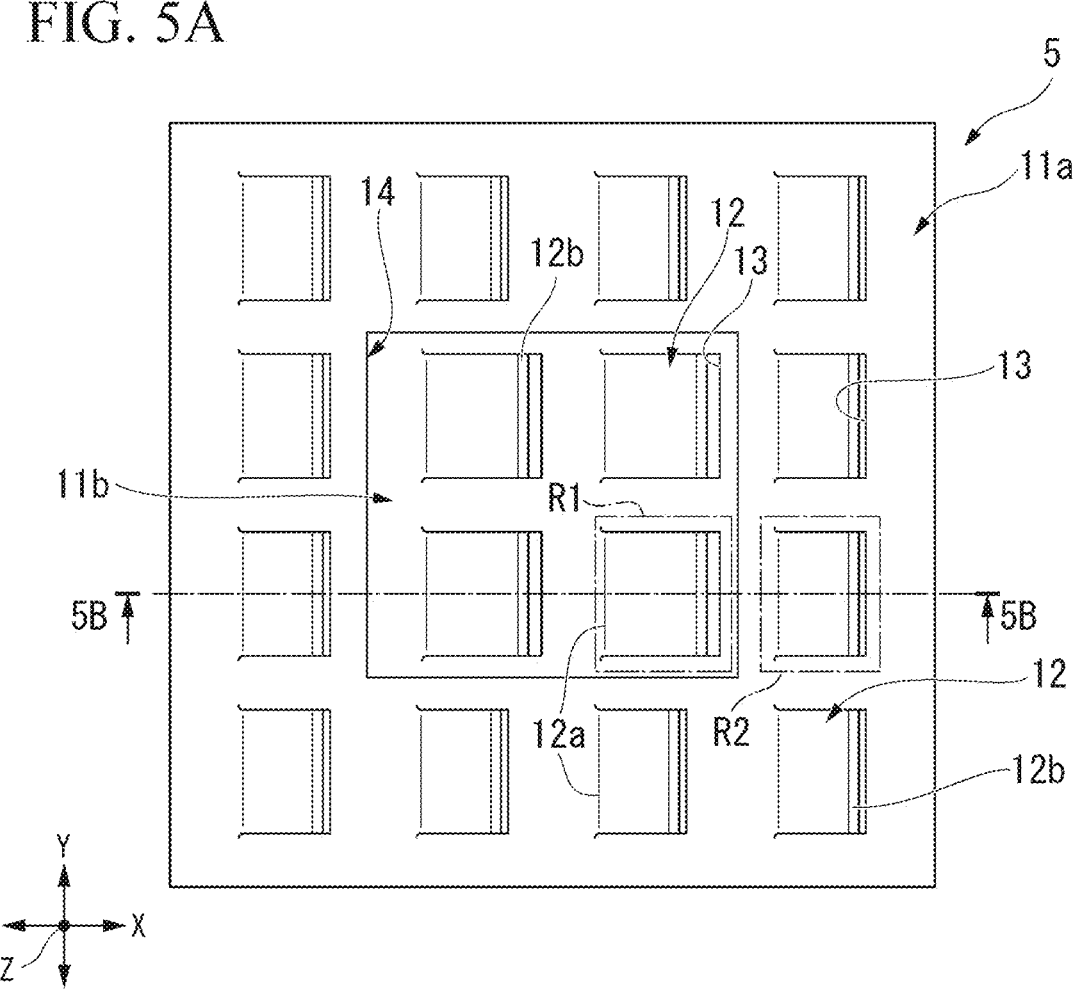
FIG. 5A is a plan view of a spring member of a fifth embodiment viewed in a first direction.
Figure 5B:
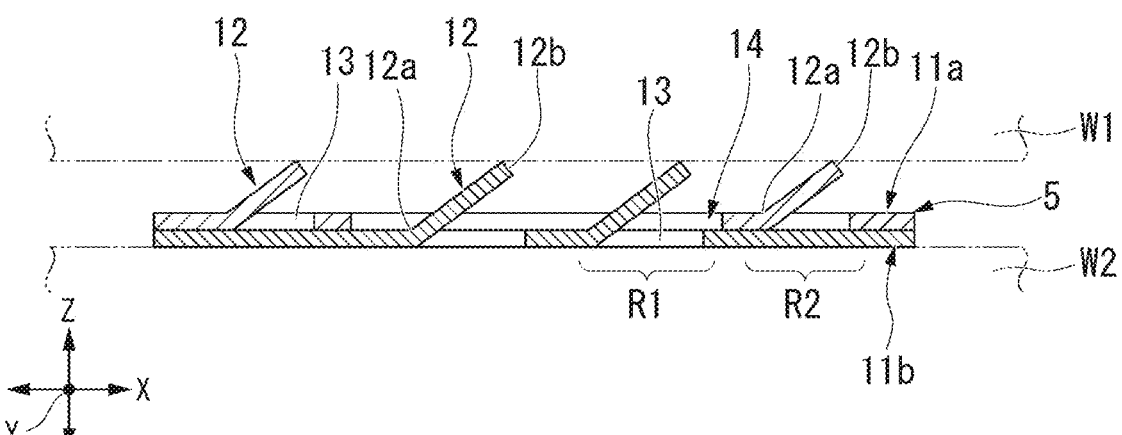
FIG. 5B is a cross-sectional view taken along line 5B-5B and viewed in an arrow direction in FIG. 5A.

In the sixth embodiment, the same components as those in the fifth embodiment shown in FIG. 5A and FIG. 5B have the same reference signs, the descriptions thereof are omitted, and only the points of difference are described.

In the spring member 6 of the present embodiment, the thicknesses of a plurality of spring protrusions 12 provided in a second base plate 11*b* are different from those of a plurality of spring protrusions 12 provided in a first base plate 11*a*. The Young's modulus of a material forming the first base plate 11*a* is the same as the Young's modulus of a material forming the second base plate 11*b*.

Figure 6:
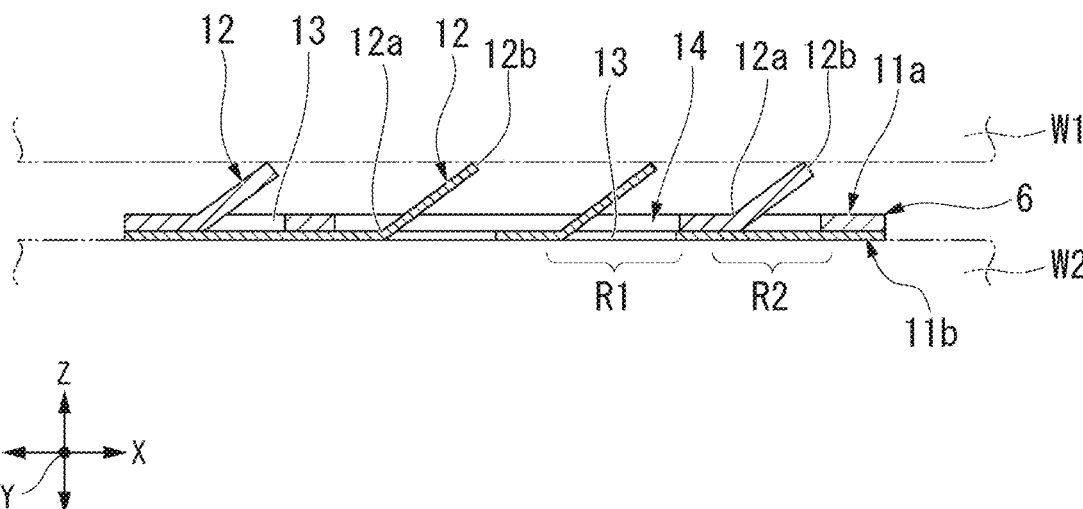
FIG. 6 is a vertical cross-sectional view along a plane parallel to a first direction and a second direction showing a main part of a spring member of a sixth embodiment.

As shown in FIG. 6, the thicknesses of the plurality of spring protrusions 12 provided in the second base plate 11*b* are less than those of the plurality of spring protrusions 12 provided in the first base plate 11*a*. The thickness of the second base plate 11*b* is less than that of the first base plate 11*a*.

Therefore, among a plurality of portions in an along-plane direction provided with the spring protrusions 12, the spring constant of each portion provided in an outer peripheral edge portion of the spring member 5 is higher than that of each portion provided in a central area of the spring member 5 in the along-plane direction.

The thicknesses of the plurality of spring protrusions 12 provided in the second base plate 11*b* may be greater than those of the plurality of spring protrusions 12 provided in the first base plate 11*a*. The thickness of the second base plate 11*b* may be greater than that of the first base plate 11*a*. Also, the Young's modulus of a material forming the first base plate 11*a* may be different from the Young's modulus of a material forming the second base plate 11*b*.

As described above, according to the spring member 6 of the present embodiment, the thicknesses of the plurality of spring protrusions 12 provided in the second base plate 11$b$ are different from those of the plurality of spring protrusions 12 provided in the first base plate 11$a$, the plurality of spring protrusions 12 provided in the second base plate 11$b$ are inserted into a second insertion hole 14 of the first base plate 11$a$ in a state of penetrating therethrough in a first direction Z, and all of the plurality of spring protrusions 12 provided in each of the base plates 11$a$ and 11$b$ are configured to contact a first pressed body W1, so it is possible to easily obtain or the like the spring member 6 with different spring constants between a plurality of positions in the along-plane direction.

Figures 7A, 7B:
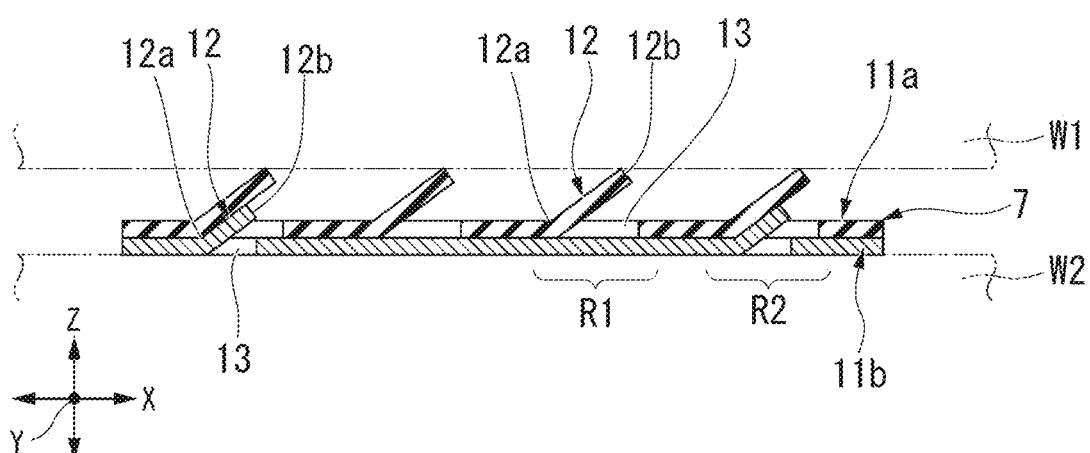
FIG. 7A is a plan view of a spring member of a seventh embodiment viewed in a first direction.
FIG. 7B is a cross-sectional view taken along line 7B-7B and viewed in an arrow direction in FIG. 7A.

Next, a spring member 7 according to a seventh embodiment of the present invention is described with reference to FIG. 7A and FIG. 7B.

In the seventh embodiment, the same components as those in the fourth embodiment shown in FIG. 4A and FIG. 4B have the same reference signs, the descriptions thereof are omitted, and only the points of difference are described.

In the spring member 7 of the present embodiment, at least part of portions of base plates 11$a$ and 11$b$, the portions contacting pressed bodies W1 and W2, is electrically insulated from the pressed bodies W1 and W2, and the two pressed bodies W1 and W2 are pressed in directions such that the pressed bodies W1 and W2 move away from each other in a first direction Z in an electrical insulation state therebetween.

The first base plate 11$a$ is made of an electrically insulating material, and the second base plate 11$b$ is made of a metal material. The lengths (i.e., the sizes in a second direction X) of a plurality of spring protrusions 12 provided in the second base plate 11$b$ are less than those of spring protrusions 12 provided in the first base plate 11$a$. Only the plurality of spring protrusions 12 provided in the first base plate 11$a$ are configured to contact the first pressed body W1 of the two pressed bodies W1 and W2, and the plurality of spring protrusions 12 provided in the second base plate 11$b$ are configured not to contact the first pressed body W1.

A configuration may be adopted in which the first base plate 11$a$ is made of a metal material, and at least the spring protrusions 12 of the first base plate 11$a$ are covered with an electrically insulating material.

As described above, according to the spring member 7 of the present embodiment, the two pressed bodies W1 and W2 are pressed in directions such that the pressed bodies W1 and W2 move away from each other in the first direction Z in an electrical insulation state therebetween, so it is possible to obtain or the like the spring member 7 suitable for products requiring electrical insulation between the two pressed bodies W1 and W2.

Figures 8A, 8B:
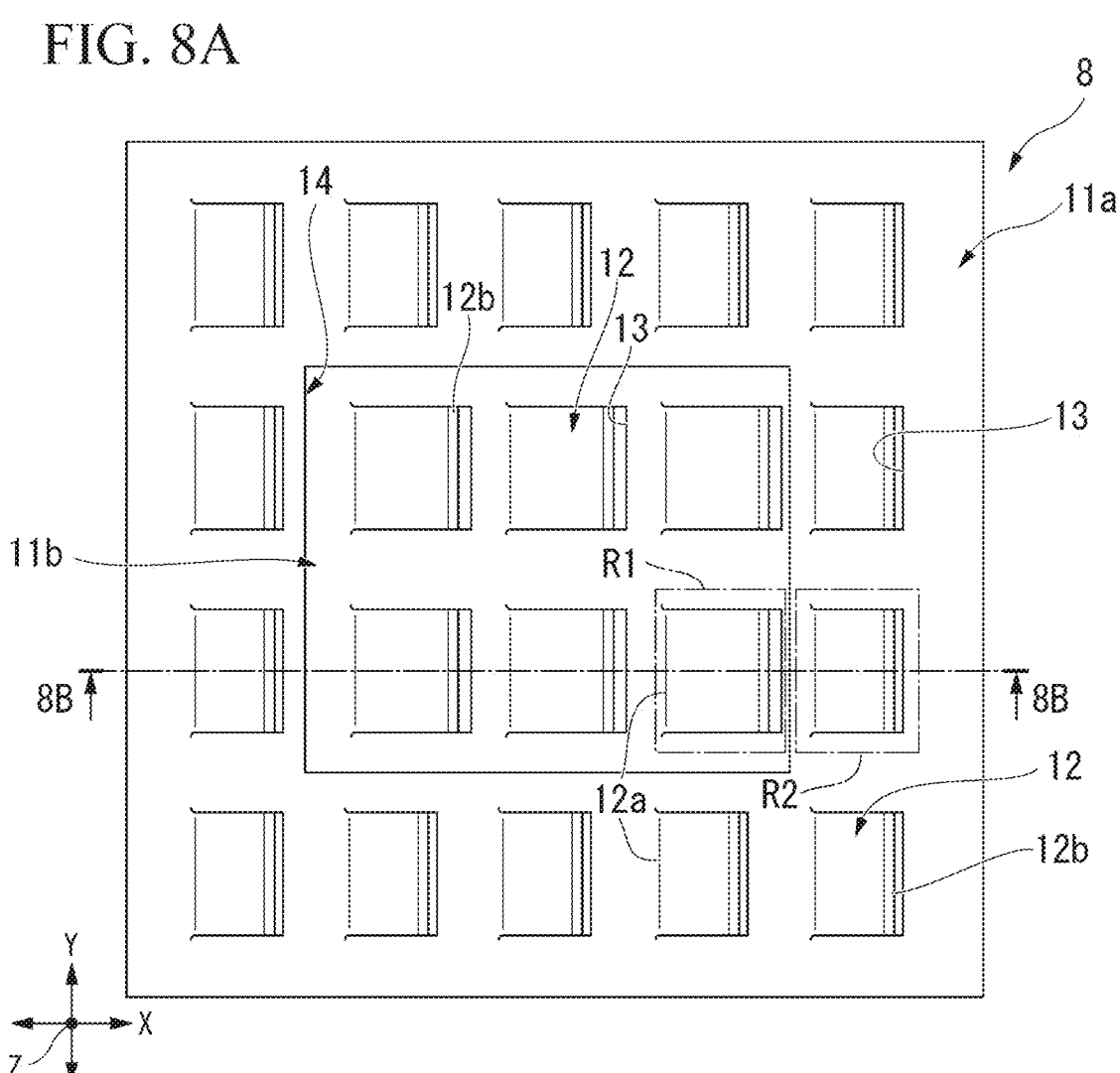
FIG. 8A is a plan view of a spring member of an eighth embodiment viewed in a first direction.
FIG. 8B is a cross-sectional view taken along line 8B-8B and viewed in an arrow direction in FIG. 8A.

Next, a spring member 8 according to an eighth embodiment of the present invention is described with reference to FIG. 8A and FIG. 8B.

In the eighth embodiment, the same components as those in the fifth embodiment shown in FIG. 5A and FIG. 5B have the same reference signs, the descriptions thereof are omitted, and only the points of difference are described.

In the spring member 8 of the present embodiment, at least part of portions of base plates 11$a$ and 11$b$, the portions contacting pressed bodies W1 and W2, is electrically insulated from the pressed bodies W1 and W2, and the two pressed bodies W1 and W2 are pressed in directions such that the pressed bodies W1 and W2 move away from each other in a first direction Z in an electrical insulation state therebetween.

The first base plate 11$a$ is made of a metal material, and the second base plate 11$b$ is made of an electrically insulating material. The lengths (i.e., the sizes in a second direction X) of a plurality of spring protrusions 12 provided in the second base plate 11$b$ are greater than those of spring protrusions 12 provided in the first base plate 11$a$. All of the plurality of spring protrusions 12 provided in each of the base plates 11$a$ and 11$b$ are configured to contact the first pressed body W1 of the two pressed bodies W1 and W2. Although the spring protrusions 12 of the first base plate 11$a$ made of the metal material are configured to contact the pressed body W1, the second base plate 11$b$ made of the electrically insulating material is disposed between the first base plate 11$a$ and the pressed body W2, so the two pressed bodies W1 and W2 are maintained in an electrical insulation state therebetween.

A configuration may be adopted in which the second base plate 11$b$ is made of a metal material, and at least part of the second base plate 11$b$ configured to contact the second pressed body W2 of the two pressed bodies W1 and W2 is covered with an electrically insulating material.

As described above, according to the spring member 8 of the present embodiment, the two pressed bodies W1 and W2 are pressed in directions such that the pressed bodies W1 and W2 move away from each other in the first direction Z in an electrical insulation state therebetween, so it is possible to obtain or the like the spring member 8 suitable for products requiring electrical insulation between the two pressed bodies W1 and W2.

Figure 9A:
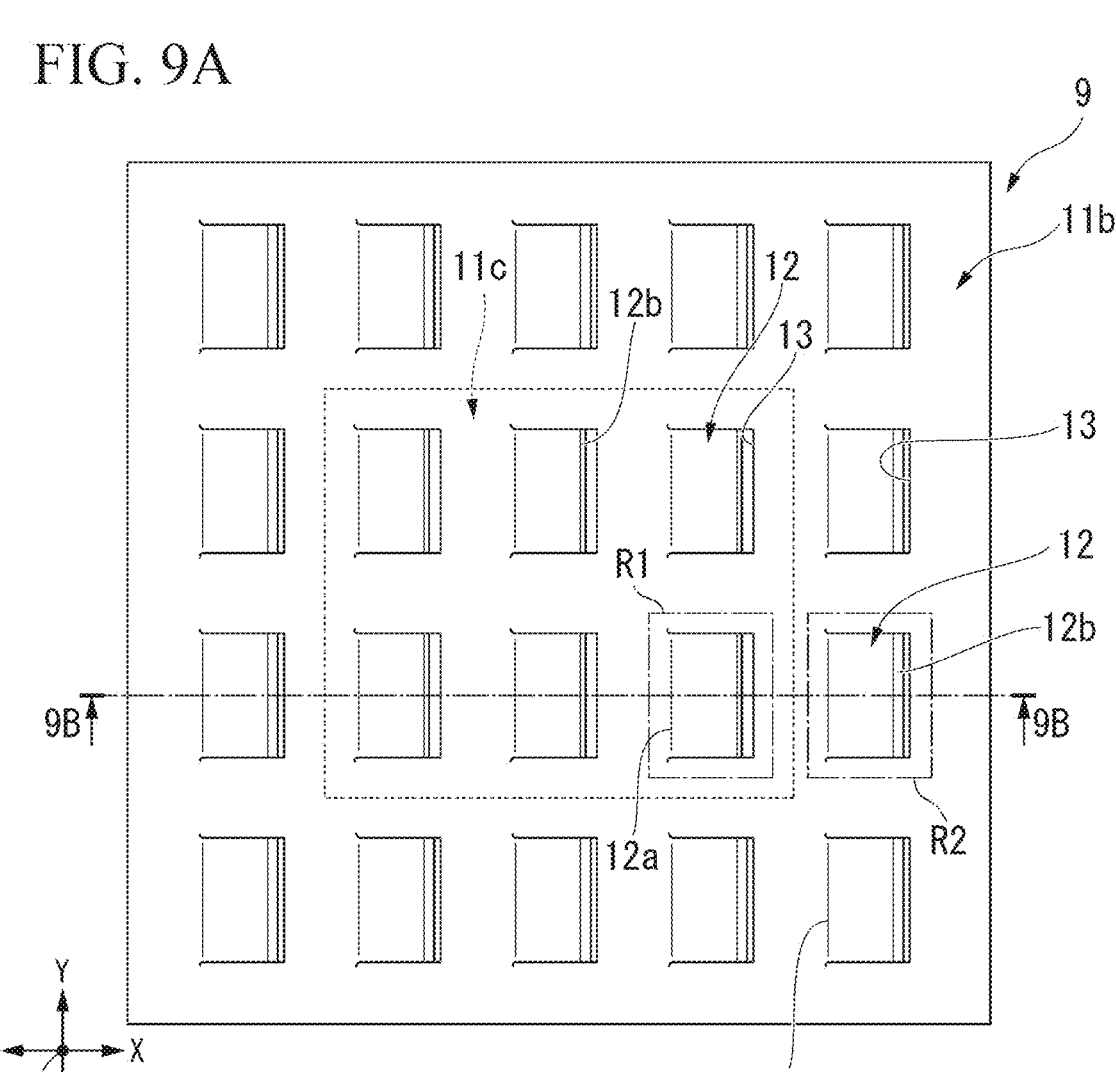
FIG. 9A is a plan view of a spring member of a ninth embodiment viewed in a first direction.
Figure 9B:
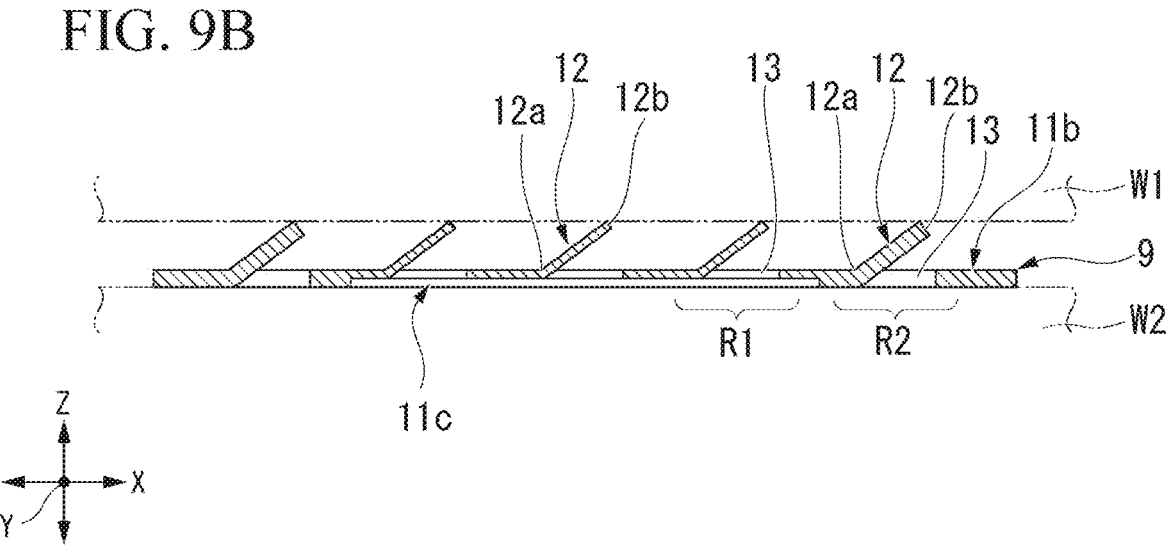
FIG. 9B is a cross-sectional view taken along line 9B-9B and viewed in an arrow direction in FIG. 9A.

Next, a spring member 9 according to a ninth embodiment of the present invention is described with reference to FIG. 9A and FIG. 9B.

In the ninth embodiment, the same components as those in the third embodiment shown in FIG. 3A and FIG. 3B have the same reference signs, the descriptions thereof are omitted, and only the points of difference are described.

The spring member 9 of the present embodiment includes one second base plate 11$b$ with front and back surfaces directed in a first direction Z. The spring member 9 is provided with no first base plate 11$a$ described in the above embodiments. Among a plurality of spring protrusions 12 provided in the second base plate 11$b$, the thickness of at least a spring protrusion 12 is different from that of another spring protrusion 12. As shown in FIG. 9A and FIG. 9B, among the plurality of spring protrusions 12 provided in the second base plate 11$b$, the thicknesses of spring protrusions 12 positioned in a central area (including a portion R1) of the second base plate 11$b$ in an along-plane direction are less than those of spring protrusions 12 positioned in an outer peripheral edge portion (including a portion R2) of the second base plate 11$b$. The thickness of the central area of the second base plate 11$b$ in the along-plane direction is less than that of the outer peripheral edge portion of the second base plate 11$b$. By providing a recess 11$c$ in the central area in the along-plane direction of a surface of the front and back surfaces of the second base plate 11$b$ facing a second pressed body W2, the thickness of the central area of the second base plate 11$b$ in the along-plane direction is less than that of the outer peripheral edge portion of the second base plate 11$b$. The spring protrusions 12 of the present embodiment are formed by press molding after the recess 11$c$ is formed.

All of the plurality of spring protrusions 12 provided in the second base plate 11$b$ are configured to contact a first pressed body W1.

Therefore, among a plurality of portions in the along-plane direction provided with the spring protrusions 12, the spring constant of each portion provided in the outer peripheral edge portion of the spring member 9 is higher than that of each portion provided in the central area of the spring member 9 in the along-plane direction.

If, for example, work hardening or the like occurs when the recess 11*c* is formed and the central area of the second base plate 11*b* in the along-plane direction becomes hard, among a plurality of portions in the along-plane direction provided with the spring protrusions 12, the spring constant of each portion provided in the outer peripheral edge portion of the spring member 9 may be lower than that of each portion provided in the central area of the spring member 9 in the along-plane direction.

The recess 11*c* may be provided in a surface of the front and back surfaces of the second base plate 11*b* facing the first pressed body W1 of the two pressed bodies W1 and W2.

As described above, according to the spring member 9 of the present embodiment, the thickness of at least a spring protrusion 12 of the plurality of spring protrusions 12 is different from that of another spring protrusion 12 thereof, so it is possible to easily obtain or the like the spring member 9 with different spring constants between a plurality of positions in the along-plane direction.

The technical scope of the present invention is not limited to the above embodiments, and various modifications can be made within the scope of the present invention.

In the first to eighth embodiments, three or more base plates may be provided. That is, in addition to the base plates 11*a* and 11*b*, another base plate may be provided.

In the above embodiments, a configuration is shown in which among a plurality of portions in the along-plane direction provided with the spring protrusions 12, the spring constant of each portion provided in the outer peripheral edge portion of the spring member is different from that of each portion provided in the central area of the spring member in the along-plane direction, but the present invention is not limited thereto, and the configuration may be changed as appropriate, for example, the spring constant may be made to be different between a plurality of positions in the second direction X or the third direction Y or may be made to be different in a zigzag manner in the along-plane direction.

A configuration may be adopted in which, for example, tip parts 12*b* are provided on two sides of a base end part 12*a* such that the base end part 12*a* is disposed between the tip parts 12*b* in the second direction X, and the spring protrusion 12 has a V-shape or a U-shape when viewed in the third direction Y. In other words, the protruding directions of two spring protrusions 12 adjacent in the second direction X may be opposite to each other.

Among the plurality of spring protrusions 12 provided in the base plates 11*a* and 11*b*, the extending directions of at least a spring protrusion 12 and another spring protrusion 12 from the base end part 12*a* toward the tip part 12*b* in the along-plane direction may be different from each other.

In this configuration, a configuration may be adopted in which the tip parts 12*b* of the spring protrusions 12 provided in the base plates 11*a* and 11*b* adjacent to each other in the first direction Z are stacked in the first direction Z.

Within the scope of the present invention, components of the above embodiments can be appropriately replaced with well-known other components, and the above embodiments and the modifications may be appropriately combined.

The invention claimed is:

1. A spring member for being provided between two pressed bodies facing each other in a first direction, the spring member comprising a plurality of base plates stacked in the first direction, wherein each base plate is provided with a plurality of spring protrusions configured to protrude toward either one pressed body of the two pressed bodies and to press the two pressed bodies in directions such that the pressed bodies move away from each other in the first direction, between two base plates of the plurality of base plates adjacent to each other in the first direction, a base plate positioned closer to the one pressed body is provided with an insertion hole into which a spring protrusion of the other base plate is inserted in a state of penetrating the insertion hole in the first direction, and among a plurality of portions in an along-plane direction along a plane orthogonal to the first direction provided with the plurality of spring protrusions, a spring constant of at least one portion is different from a spring constant of another portion.

2. The spring member according to claim 1, wherein among the plurality of spring protrusions provided in at least one base plate of the plurality of base plates, a volume of a spring protrusion provided in the one portion is different from a volume of a spring protrusion provided in the other portion.

3. The spring member according to claim 1, wherein the number of spring protrusions positioned in the one portion is different from the number of spring protrusions positioned in the other portion, and spring protrusions positioned in an equal portion are stacked in the first direction.

4. The spring member according to claim 1, wherein among the plurality of base plates, a Young's modulus of a material forming at least one base plate is different from a Young's modulus of a material forming another base plate.

5. The spring member according to claim 1, wherein at least part of portions of the base plates, the portions contacting the pressed bodies, is electrically insulated from the pressed bodies, and the two pressed bodies are pressed in directions such that the pressed bodies move away from each other in the first direction in an electrical insulation state therebetween.

6. A spring member for being provided between two pressed bodies facing each other in a first direction, the spring member comprising one base plate with front and back surfaces directed in the first direction, wherein the base plate is provided with a plurality of spring protrusions protruding in the first direction and configured to press the two pressed bodies in directions such that the pressed bodies move away from each other in the first direction, and among the plurality of spring protrusions, a thickness of at least a spring protrusion is different from a thickness of another spring protrusion.

* * * * *